March 17, 1936.   M. KAPLOWITZ   2,033,940
MULTIPLE REFLECTOR
Filed June 28, 1934

Inventor
M. Kaplowitz
By his Attorney J. Ledermann

Patented Mar. 17, 1936

2,033,940

UNITED STATES PATENT OFFICE 2,033,940

MULTIPLE REFLECTOR

Morris Kaplowitz, Park Ridge, N. J., assignor to Microphone Corporation of America, Brooklyn, N. Y., a corporation of New York Application June 28, 1934, Serial No. 732,859

7 Claims. (Cl. 88—82)

One object of this invention is the provision of a multiple reflector unit of the type adapted to be mounted on the rear of a vehicle to reflect a visible light, preferably colored, back in the direction of a following vehicle whose headlight rays strike the reflector, the entire device being so designed and constructed that the costs of manufacture are reduced to a minimum while the efficiency, practicability and durability are raised to the maximum.

Another object of the invention is the provision of such a device, in which a plurality of individual reflecting lenses consisting of glass spheres or lenses are set into sockets in the casing, the inner tips of the spheres being offset at a distance from cup-shaped reflecting surfaces formed in a reflecting element mounted within the casing. The distance between each sphere and its adjacent reflecting surface is such that the foci of both lie at approximately the same point.

A further object of the invention is to provide means for mounting the spheres or lenses of glass in a watertight, airtight, and rainproof manner.

Another object is the provision of means mounted within the casing for giving the reflected light a color, such as red, for instance.

The above and other objects will become apparent in the description below, in which characters of reference refer to like-named parts in the drawing.

Referring briefly to the drawing, Figure 1 is a front view of the assembled unit.

Figure 1:
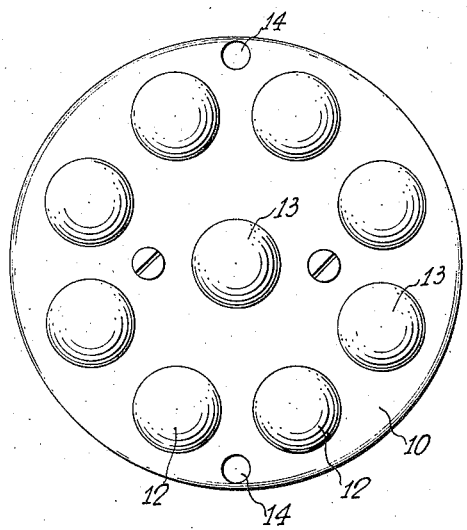
Figure 3:
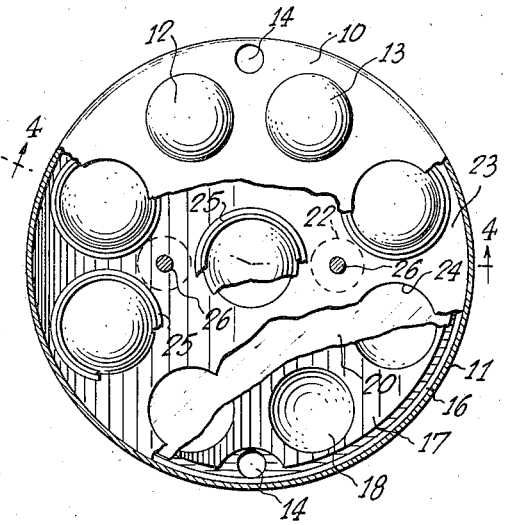
Figure 3 is a view similar to Figure 1, with parts broken away to expose the interior.
Figure 2:
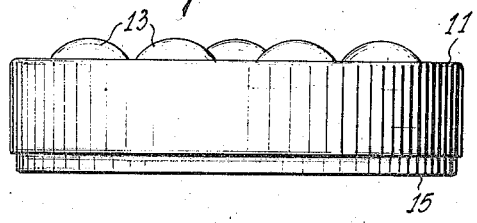
Figure 2 is a side view of the same.

Referring in detail to the drawing, the numeral 10 indicates the front wall of the casing containing the device, this wall having integral therewith a cylindrical flange 11 which provides the enclosing side wall of the casing. A plurality of circular cut-outs 12 are provided in the wall 10, these cut-outs being adapted to receive from within the casing, lenses comprising glass spheres or the like, 13. The diameters of the spheres are larger than those of the cut-outs, so that the spheres cannot slip therethrough. Screw holes 14 are provided for mounting the device on a vehicle.

The rear wall 15 of the casing is also provided with an integral cylindrical flange, indicated at 16, which is adapted to be slipped inside the flange or wall 11 and fit snugly therein.

The reflector element 17 comprises a disk having a number of concave-shaped reflecting surfaces 18 formed therein, the entire element 17 being provided with a high-efficiency reflecting surface in whatever manner desired. Openings 19 are provided in the disk 17 for the passage therethrough of the attaching or mounting screws, not shown.

Figure 4:
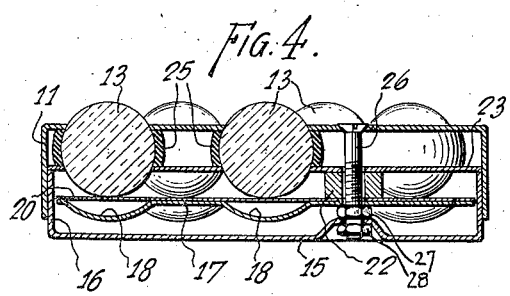
Figure 4 is a cross-sectional view taken on the line 4—4 of Figure 3.
Figure 5:
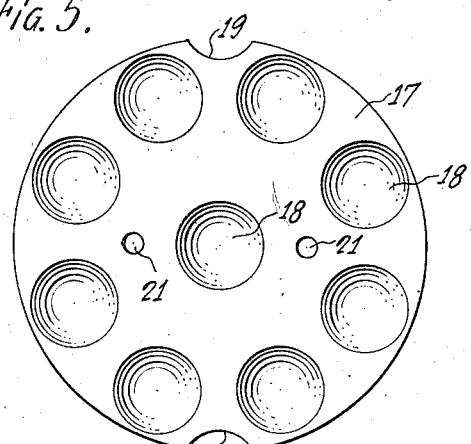
Figure 5 is a plan view of the reflecting element per se.

In the illustration in Figure 4, the disk 17 is shown held by screws 26 against the casing wall 10. When it is desired that the reflected light of the device be red in color, a translucent red disk 20 is set directly against the disk 17, and the spheres 13 are of clear glass, since red glass spheres or lenses are difficult to manufacture. If other colors than red, or colorless effects, are desired, then the appropriately colored translucent disk 20 is used. The outer edges of discs 20 and 17 may be cemented together to protect the reflector from tarnish or corrosion. When colored spheres or lenses are used, the disk 20 may be omitted. Both disks 17 and 20 are provided with holes 21 through which screws pass, as described below.

Spacer sleeves 22 are provided in alignment with the holes 21, and rest on the disk 20 (Figure 4) or directly on the flat surface of the disk 17 when the disk 20 is omitted. A disk 23, identical to the front wall 10 with the exception that it is of smaller diameter so that it may slip inside the side wall 11, rests on the spacer sleeves 22 (Figure 4). The spheres 13 are placed in the sockets 24 of the disk 23. Each sphere 13 is surrounded by a rubber belt or gasket 25, these gaskets 25 being clamped between the disk 23 (at the bottom, Figure 4) and the front wall 10 (at the top). The flange 16 of the back plate 15 presses against the disk 23 to further retain the latter in position against the gaskets 25. Locking screws 26 extend from the front wall 10, through the disks 23, 20, and 17, and nuts 27 thereon provide means for clamping the various parts therebetween firmly and compactly in the casing. The rubber gaskets 25 not only prevent loosening and rattling of the spheres 13, but also provide a waterproofing means in the front wall where the spheres project therefrom. Additional nuts 28 on the ends of the screws 26, resting in cup-like depressions in the back wall 15, lock the latter to the casing.

When rays of light strike the reflector, the spheres 13 act as lenses and focus the rays on the reflecting surfaces 18, which reflect them back through the spheres, so that the reflected rays bear the color of the spheres, or, in the case of plain spheres, the color of the colored disk 20 through which the reflected rays pass. It is to be noted (Figure 4) that the lowermost tips of the spheres 13 lie at a distance from their respective reflecting surfaces 18, for the reason above-mentioned.

Obviously, the reflector unit above-described may be put to other uses than that mentioned. It may, for instance, be used for illuminated signs for advertising purposes, or it may be mounted on stationary objects as well as vehicles.

It is further obvious that modifications and alterations in form and structure may be made without departing from the spirit and scope of the invention.

I claim:—

1. A device of the class described comprising a casing having a front wall provided with a plurality of sockets, a rear wall, a reflector element mounted adjacent said rear wall, a plurality of glass spheres mounted within the casing and projecting through said sockets, said reflector element comprising a disk having a plurality of concave reflecting surfaces thereon, each of said surfaces being in optical alignment and focus with one of said spheres, a disk mounted between and spaced-apart from said front wall and said reflector element, said disk having a plurality of sockets aligned with said first-named sockets and having said spheres projecting therethrough.

2. A device of the class described comprising a casing having a front wall provided with a plurality of sockets, a rear wall, a reflector element mounted adjacent said rear wall, a plurality of glass spheres mounted within the casing and projecting through said sockets, said reflector element comprising a disk having a plurality of concave reflecting surfaces thereon, each of said surfaces being in optical alignment and focus with one of said spheres, a disk mounted between and spaced-apart from said front wall and said reflector element, said disk having a plurality of sockets aligned with said first-named sockets and having said spheres projecting therethrough, said spheres being mounted in seats of relatively soft material.

3. A device of the class described comprising a casing having a front wall provided with a plurality of sockets, a rear wall, a reflector element mounted adjacent said rear wall, a plurality of glass spheres mounted within the casing and projecting through said sockets, said reflector element comprising a disk having a plurality of concave reflecting surfaces thereon, each of said surfaces being in optical alignment and focus with one of said spheres, a disc mounted between and spaced apart from said front wall and said reflector element, said disc having a plurality of sockets aligned with said first-named sockets and having said spheres projecting therethrough, and a translucent disk mounted between said reflector element and said spheres.

4. A device of the class described comprising a casing having a front wall provided with a plurality of sockets, a rear wall, a reflector element mounted adjacent said rear wall, a plurality of glass spheres mounted within the casing and projecting through said sockets, said reflector element comprising a disk having a plurality of concave reflecting surfaces thereon, each of said surfaces being in optical alignment and focus with one of said spheres, a second disc mounted between said front wall and said reflector element, said second disk having a plurality of sockets aligned with said first-named sockets and having said spheres projecting therethrough, locking screws passing through said casing, through said disks, and through said reflecting element, and spacer sleeves surrounding said screws between said reflecting element and said second-named disk.

5. A device of the class described comprising a casing having a front wall provided with a plurality of sockets, a rear wall, a reflector mounted adjacent said rear wall, a plurality of glass spheres mounted within the casing and projecting through said sockets, said reflector comprising a plurality of concave reflecting surfaces each of said surfaces being in optical alignment and focus with one of said spheres, a disc mounted between and spaced apart from said front wall and said reflector element, said disc having a plurality of sockets aligned with said first-named sockets and having said spheres projecting therethrough, and a translucent disk mounted between said reflector and said spheres.

6. A device of the class described comprising a casing having a front wall provided with a plurality of sockets, a plurality of lenses mounted within the casing and projecting through said sockets, a reflector element mounted within said casing rearward of said lenses, said reflector element comprising a disc having a plurality of concave reflecting surfaces thereon, each of said surfaces being in optical alignment and focus with one of said lenses, a disc mounted between and spaced-apart from said front wall and said reflector element, said disc having a plurality of sockets aligned with said first-named sockets and having said lenses projecting therethrough, and means for retaining the entire said device compact within said casing.

7. A device of the class described comprising a casing having a front wall provided with a plurality of sockets, a plurality of lenses mounted within the casing and projecting through said sockets, a reflector element mounted within said casing rearward of said lenses, said reflector element comprising a disc having a plurality of concave reflecting surfaces thereon, each of said surfaces being in optical alignment and focus with one of said lenses, a disc mounted between and spaced-apart from said front wall and said reflector element, said disc having a plurality of sockets aligned with said first-named sockets and having said lenses projecting therethrough, means for retaining the entire said device compact within said casing, and means for keeping said reflector element spaced-apart from said lenses.

MORRIS KAPLOWITZ.